(No Model.) 2 Sheets—Sheet 1.
J. SCHREICK.
APPARATUS FOR DISTRIBUTING SOLUTIONS FOR DESTROYING INSECTS.
No. 502,766. Patented Aug. 8, 1893.
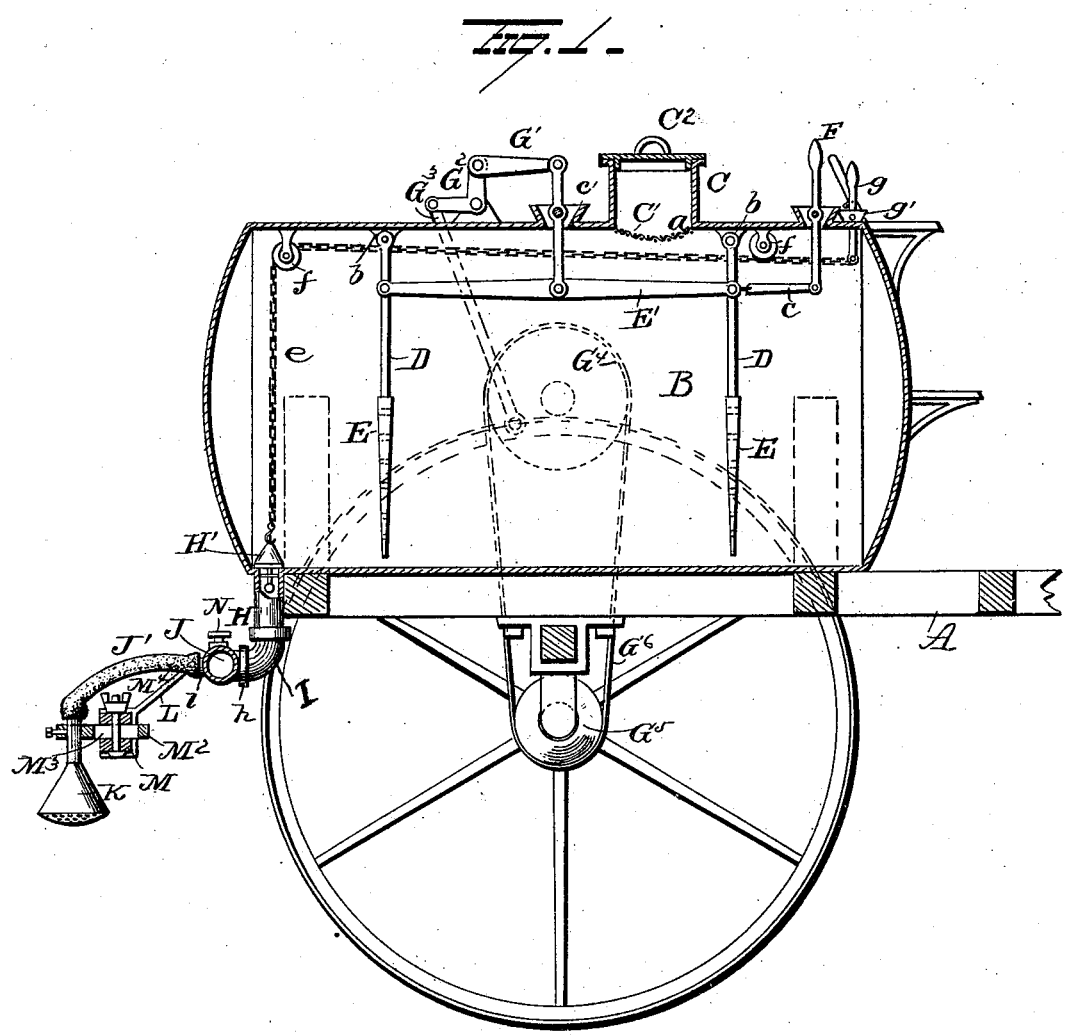
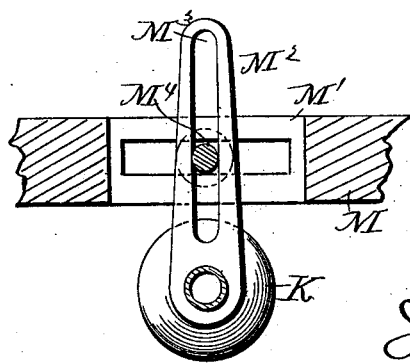
Witnesses
Inventor
Jacob Schreick.
Attorney (No Model.) 2 Sheets—Sheet 2.
J. SCHREICK.
APPARATUS FOR DISTRIBUTING SOLUTIONS FOR DESTROYING INSECTS.
No. 502,766. Patented Aug. 8, 1893.
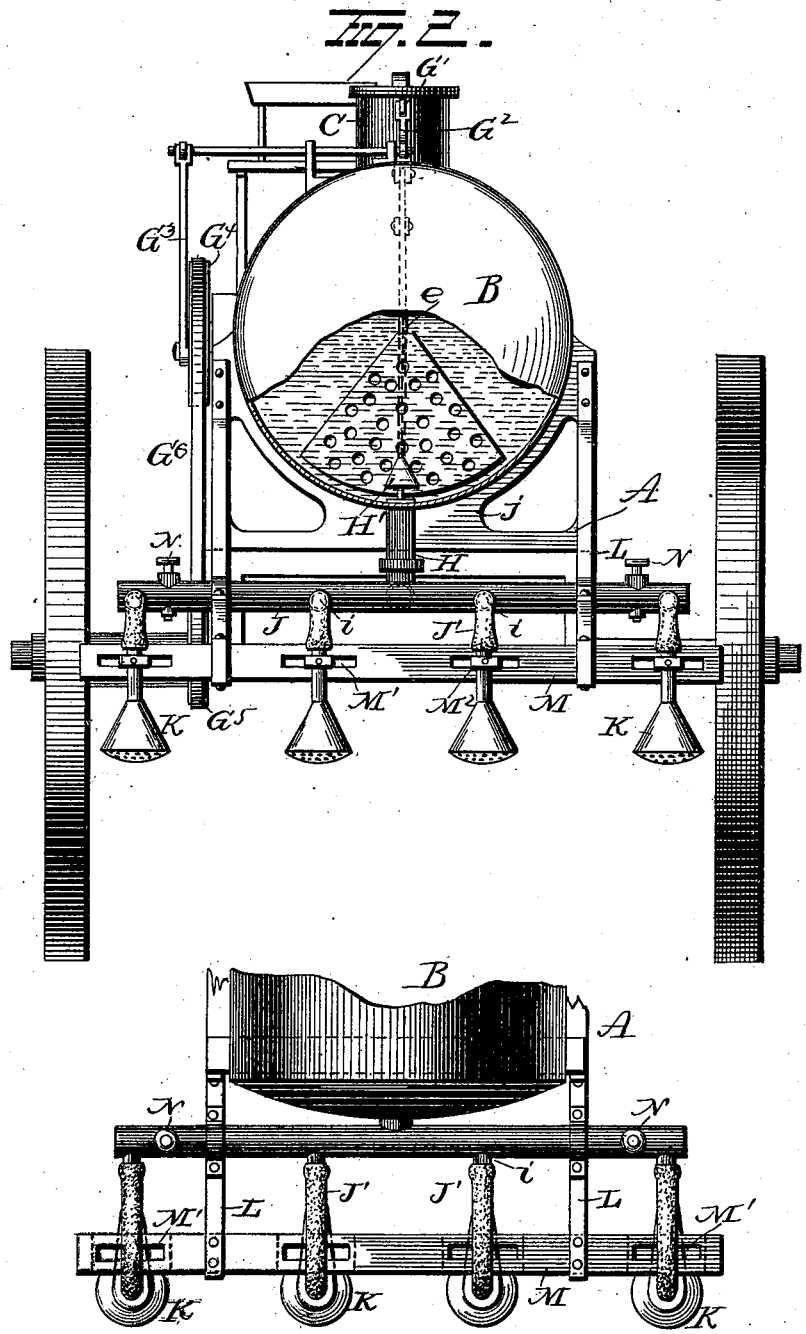
Witnesses
Inventor
Jacob Schreick
Attorney

UNITED STATES PATENT OFFICE.

JACOB SCHREICK, OF LOUISVILLE, KENTUCKY.

APPARATUS FOR DISTRIBUTING SOLUTIONS FOR DESTROYING INSECTS.

SPECIFICATION forming part of Letters Patent No. 502,766, dated August 8, 1893.

Application filed August 20, 1892. Serial No. 443,608. (No model.)

*To all whom it may concern:*

Be it known that I, JACOB SCHREICK, of Louisville, in the county of Jefferson and State of Kentucky, have invented certain new and useful Improvements in Apparatus for Distributing Solutions for Destroying Insects; and I do hereby declare the following to be a full, clear, and exact description of the invention, such as will enable others skilled in the art to which it appertains to make and use the same.

My invention relates to an improvement in apparatus for distributing a solution of paris green or similar material on potato or cotton vines or other plants, to destroy the insects which thrive thereon, the object of the invention being to provide an apparatus for distributing an insect destroyer on plants, with devices for keeping the ingredients of which the destroyer is composed, properly agitated or mixed.

A further object is to produce an apparatus for distributing a liquid insect destroyer on plants, vines, &c., which shall be simple in construction and effectual in the performance of its functions.

With these objects in view the invention consists in certain novel features of construction and combinations and arrangements of parts as hereinafter set forth and pointed out in the claims.

In the accompanying drawings: Figure 1 is a longitudinal sectional view of my improvements. Fig. 2 is an end view. Fig. 3 is a plan view of a portion of the apparatus. Fig. 4 is a detail view.

A represents a vehicle on which a tank B is located, which latter is provided on its top with an opening $a$ in which a neck C having a perforated bottom or strainer C' is located, the purpose of said receptacle being to facilitate the filling of the tank and is preferably provided with a cover $C^2$. Brackets $b$ project from the top of the tank and have pivotally connected to them, depending rods or bars D, to each of which a perforated paddle or agitator E is secured,—the two (more or less) rods or bars D being connected by means of a rod E', which is pivotally connected at its ends to said rods or bars D. A rod or pitman $c$ may, if desired, be pivotally connected at one end to one of the rods or bars D and at the other end to one end of a pivoted operating lever F, which latter projects through the wall of the tank in position to be grasped by an operator to agitate the paddles or agitators E.

While I have shown means in Fig. 1 for operating the agitators by hand, I have also shown in said figure means for automatically operating the agitators, and I prefer to employ said automatically operated devices, as by their use the liquid insect destroying material in the tank would be more thoroughly agitated and mixed and the operator will be relieved of the duty of vibrating the agitators.

The automatic devices above referred to will be constructed and arranged in a manner now to be described. A lever G is pivoted at a point between its ends in a suitable bracket $c'$ on the tank, and at its lower end is pivotally connected to the rod E'. To the upper end of the lever G, a pitman G' is pivoted,— the other end of said pitman being pivoted to a bell-crank-lever $G^2$ carried by a bracket $d$ on the tank. The other arm of the bell-crank-lever $G^2$ has a pitman $G^3$ pivoted to it, the other end of said pitman being connected eccentrically to a wheel or pulley $G^4$. The wheel or pulley $G^4$ derives its motion from a wheel or pulley $G^5$ on the hub of one of the drive wheels of the vehicle, through the medium of a strap or drive chain $G^6$. From this construction and arrangement of parts it will be seen that while the vehicle is in motion the material in the tank will be kept thoroughly agitated and mixed.

The tank B is provided at one end with an outlet H, provided with a valve H'. A chain $e$ is attached to the valve H' and passes upwardly to the top of the tank and then over a series of guide wheels $f$, and at its other end is attached to a hand lever $g$, supported by means of a bracket $g'$ on the tank. By this means the valve H' may be readily opened and closed.

A pipe or elbow I is connected with the outlet H and projects downwardly therefrom. At the lower end of the pipe I, a horizontal pipe J is attached by means of a suitable coupling $h$, said horizontal pipe being provided with a series of outlets $i$. To each outlet $i$, a flexible pipe J' is attached, and at the free lower end of each flexible pipe J', a sprinkler K is attached and adapted to discharge a mixture or liquid containing paris green or similar material onto the plants or vines over which the apparatus passes.

Secured to the brackets $j$ which support the tank B, or if desired to the end of the tank, are brackets L, which support at their lower ends, a horizontal bar M having a series of elongated slots M′. Located in each elongated slot M′, is a bar or bracket M² disposed in a horizontal position and provided with an elongated slot M³. To the bars or brackets M² the tubes J, which carry the sprinklers K are attached. A set screw M⁴ passes through each elongated slot M′ and slots M⁵ in the bar M and through each elongated slot M³ in the bars or brackets M². By this means the sprinklers can be readily adjusted so as to bring them in proper relation to the plants to be acted upon. Valves N will preferably be located in proximity to the ends of the bar M so as to control the flow of liquid through the sprinklers at the ends of the pipe I.

The apparatus is simple in construction and effectual in the performance of its functions.

Having fully described my invention, what I claim as new, and desire to secure by Letters Patent, is—

1. The combination with a vehicle, and a wheel or pulley carried by the hub of one of the wheels thereof, of a tank carried by the vehicle, agitators suspended in said tank, a rod connecting said agitators, a pivoted lever connected at one end to said rod, a bell-crank-lever, a pitman connecting said bell-crank-lever and pivoted lever, a wheel or pulley, a pitman connected at one end eccentrically to said wheel or pulley, and a band or chain passing over said wheels or pulleys, substantially as and for the purpose set forth.

2. The combination with a tank, a discharge pipe, and flexible tubes having sprinklers thereon extending from the pipe, of a bar having elongated slots therein running longitudinally of the bar and intersecting each other, brackets located in one set of the slots adapted to hold the sprinkler, and devices passing through the intersecting slots for holding the bracket adjustably in the slot, whereby the position of the sprinklers may be changed.

3. The combination with a tank, and a water discharge pipe, of a cross bar having intersecting elongated slots therein extending longitudinally of the bar, flexible pipes leading from the water discharge pipe and having spraying devices on their free ends, brackets for supporting the spraying devices, said brackets provided with elongated slots and adapted to be inserted in slots in the cross bar, and bolts passed through slots in the cross bar and in the brackets for adjustably holding the brackets with their attached spraying devices in position, substantially as set forth.

4. The combination with a vehicle, and a tank thereon, of agitators pivoted inside of the tank and adapted to swing therein, a bar connecting the agitators, a hand lever and power mechanism, connected with the agitators whereby they may be vibrated by hand or by power, substantially as set forth.

In testimony whereof I have signed this specification in the presence of two subscribing witnesses.

JACOB SCHREICK.

Witnesses:
CHAS. G. HULSEWEDE,
H. UHLEN.